United States Patent

[11] 3,603,861

| [72] | Inventors | William A. Staats, Torrance;<br>William R. Baynes, Palos Verdes Peninsula, both of, Calif. |
|---|---|---|
| [21] | Appl. No. | 5,007 |
| [22] | Filed | Jan. 22, 1970 |
| [45] | Patented | Sept. 7, 1971 |
| [73] | Assignee | Mattel, Inc.<br>Hawthorne, Calif. |

[54] ELECTROMECHANICAL DISCHARGE-CHARGE CYCLE-BATTERY CHARGER
10 Claims, 7 Drawing Figs.

[52] U.S. Cl. ..................................................... 320/14,
46/243(m), 320/2, 320/21, 320/38
[51] Int. Cl. ....................................................... H02j 7/02
[50] Field of Search............................................ 320/2, 14,
21, 35, 31, 37, 38, 43, 44, 45; 46/206, 243 M

[56] References Cited
UNITED STATES PATENTS
1,962,870  6/1934  Henbst .......................... 46/206

| 3,271,652 | 9/1966 | Walz et al. ..................... | 320/44 |
| 3,344,334 | 9/1967 | Rubin ............................ | 320/2 |
| 3,445,744 | 5/1969 | Henderson et al. ............ | 320/31 X |
| 3,483,460 | 12/1969 | MacCrea ...................... | 320/31 |
| 3,500,167 | 3/1970 | Applegate et al. ............ | 320/14 |

*Primary Examiner*—William H. Beha, Jr.
*Assistant Examiner*—John M. Gunther
*Attorney*—Seymour A. Scholnick

ABSTRACT: This is a battery charger for rapidly recharging relatively small-capacity rechargeable batteries. The batteries are recharged by being placed in electrical contact with terminals that are electrically coupled to a source of DC current, a current path being completed through the battery or batteries to be recharged. The charger includes a spring-driven rotary switch that sequentially contacts a discharge terminal and then a charge terminal, the battery being thereby first discharged for a predetermined period of time and then charged for a predetermined period of time.

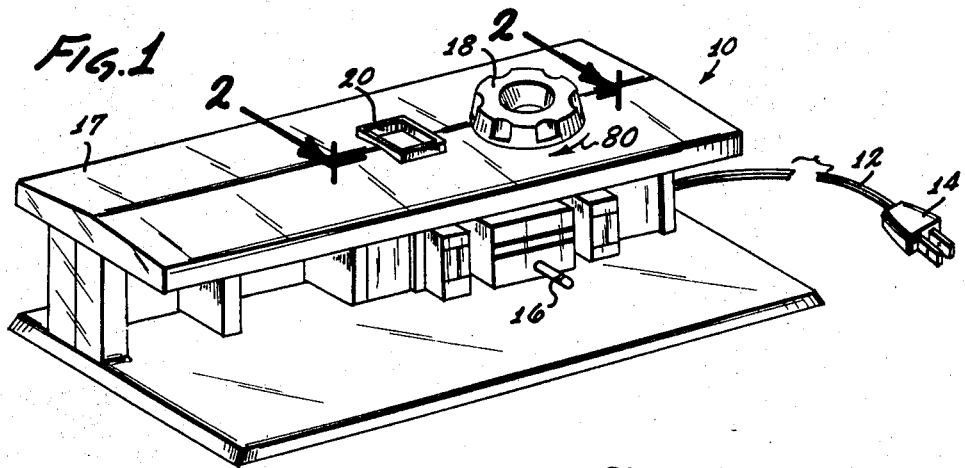
Fig. 1
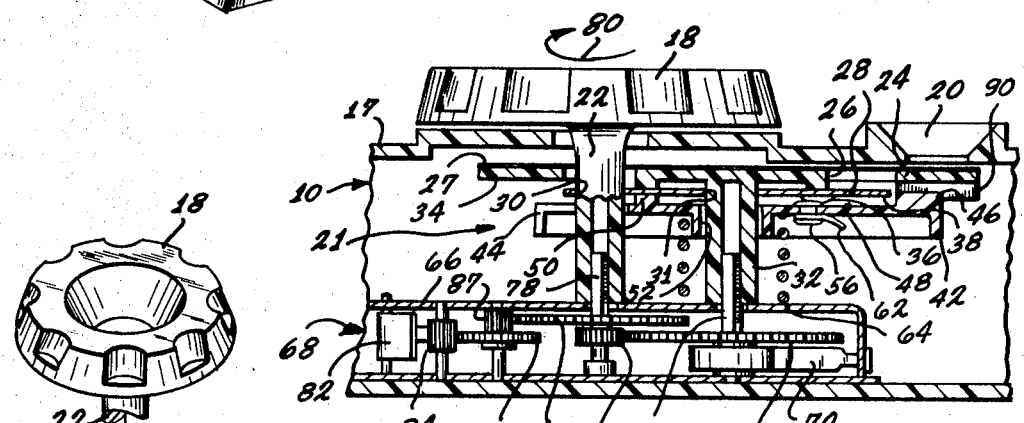
Fig. 2
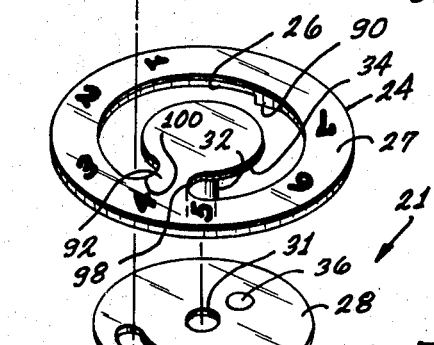
Fig. 3
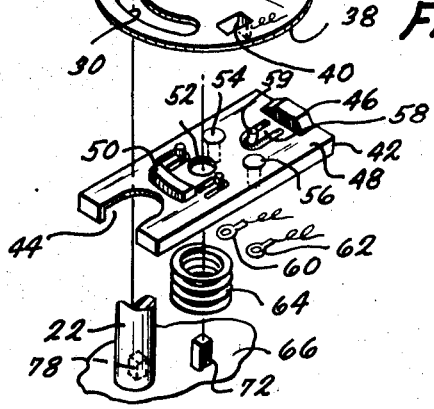
INVENTORS
WILLIAM A. STAATS
WILLIAM R. BAYNES
BY Max E. Shirk
ATTORNEY

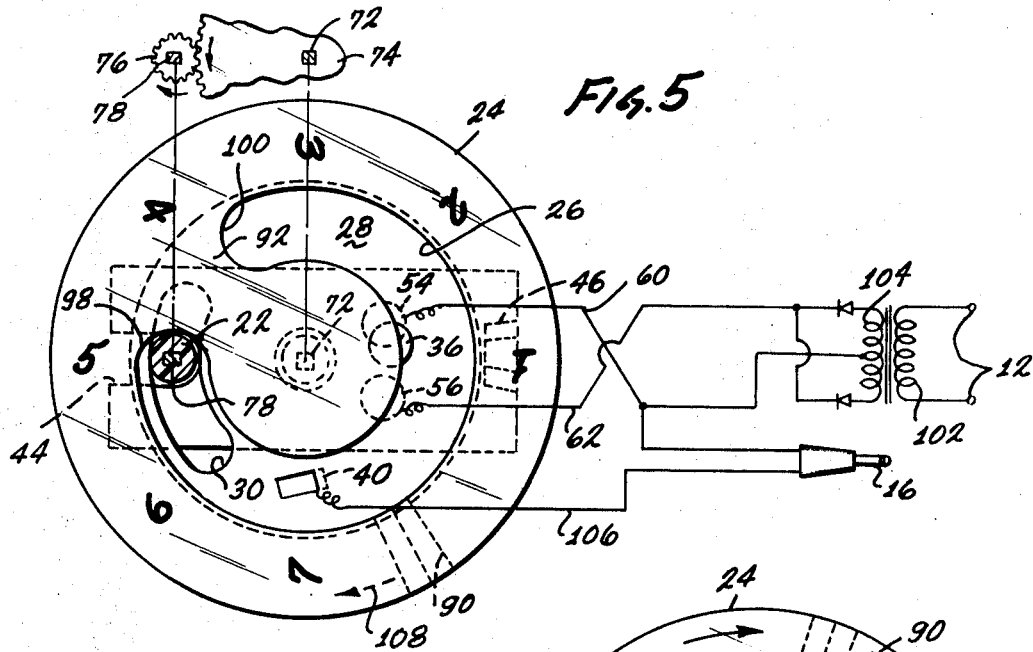
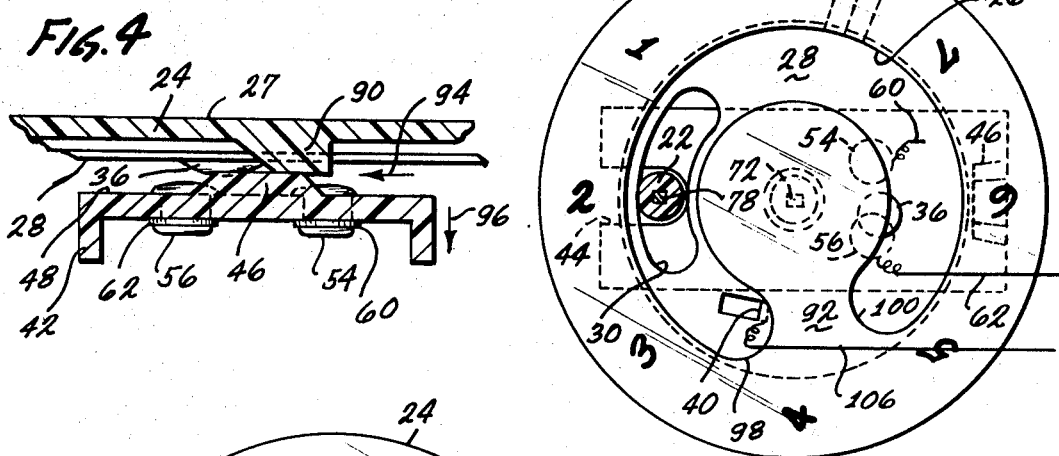
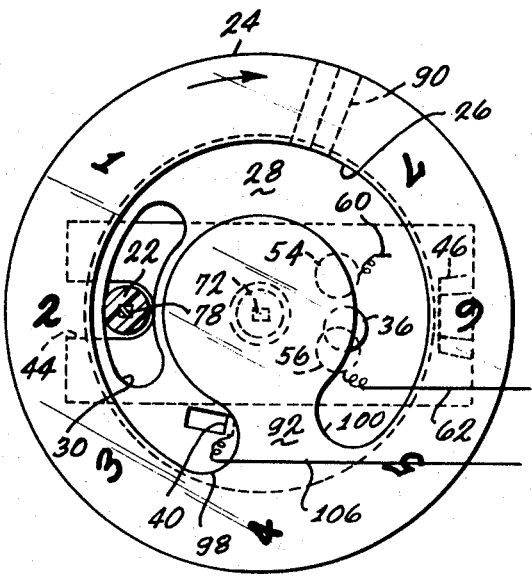
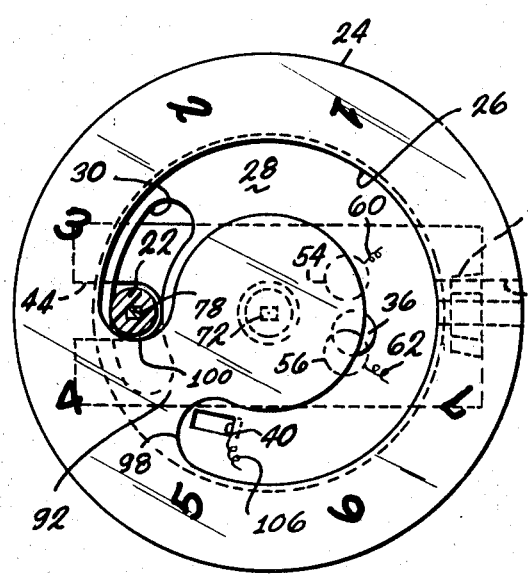
INVENTORS
WILLIAM A. STAATS
WILLIAM R. BAYNES
BY *MaxE. Shirk*
ATTORNEY

3,603,861

ELECTROMECHANICAL DISCHARGE-CHARGE CYCLE-BATTERY CHARGER

BACKGROUND OF THE INVENTION

The background of the invention will be set forth in two parts.

FIELD OF THE INVENTION

The present invention generally pertains to the field of battery chargers and more particularly to an improved battery charger that is designed to quickly recharge small-capacity rechargeable batteries in a time-controlled sequence wherein a battery is first discharged and subsequently recharged.

DESCRIPTION OF THE PRIOR ART

The many advantages of rechargeable batteries over batteries that cannot be recharged are well known. For many years, the only economically feasible and practical rechargeable unit was the wet battery, such as the lead-acid type. Such wet batteries were generally limited to applications, such as automobiles, boats and aircraft, that could tolerate and accommodate their disadvantages. Among the disadvantages associated with wet batteries were the problems presented by bulk, the venting of unstable gases, and the requirement that such batteries be maintained in an upright position to prevent leakage of extremely corrosive fluids and to allow proper venting.

Development of the state of the art introduced the technique of combining a basic liquid electrolyte with other materials to produce a nonflowing electrolyte that could be sealed in containers similar to nonrechargeable "dry" batteries. Further, the development of controlled gas generation in some liquid electrolyte batteries negated the necessity of venting.

Upon development of a variety of rechargeable batteries, the problem of properly recharging these units had to be solved because it was soon found that improper recharging practices resulted in short discharge-charge cycle life. One available battery-recharging technique is commonly known as the "taper current" type charge which employs a voltage underload equal to the voltage of the battery when fully charged. In order to prevent excessive current flow during initial connection of a deeply discharged battery to the charger, a series resistance was incorporated.

Another frequently used charging technique includes what is commonly known as a "voltage-limited taper current circuit" which employs a voltage-reference element, such as a Zener diode, and transistors as proportioning devices. This technique prevents overcharging and, thus, suppresses gassing by controlling the charging current and voltage throughout the charging period. As is well known, overcharging causes hydrolysis to occur and results in the liberation of gases such as hydrogen and oxygen at a rate faster than that at which the gases will recombine or escape by diffusion through the fields. Whenever there is gassing, a safety valve must be provided or the buildup of pressure will rupture the battery case.

In the above-described charging arrangement and in a similar arrangement, not described here, some batteries may require charging periods of between 12 to 15 hours in order to prevent cell damage due to overheating. As is well known, overheating of a battery will cause the evaporation of the electrolyte, the buildup of internal pressure and the warping of the electrodes resulting in internal short circuits. Such overheating is often due to the high internal resistance of the cells, possibly caused by gas bubbles forming a layer on the surface of an internal electrode plate.

Among the types of rechargeable batteries that are most susceptible to damage caused by quick charging techniques are those that are small, those that are permanently sealed with no provision for venting, and those that have a relatively constant potential during discharge. These characteristics are common to the very popular hermetically sealed nickel-cadium batteries which are free of the usual routine maintenance, such as the addition of water or electrolyte. While nickel-cadium batteries may be damaged by rapid charging or recharging, they ordinarily have excellent charge-retention characteristics and produce no corrosive fumes.

The typical voltage differential between a charged and discharged nickel-cadmium battery may be as little as three-tenths of a volt. This very small differential makes it extremely difficult to design a circuit sensitive enough to differentiate between the voltage of a discharged cell and that of a fully charged cell to prevent overcharging which will cause oxygen to be evolved at the nickel electrode faster than it can be reacted with at the cadmium electrode. The excessive pressure thus produced can cause cell rupture.

Recently, an advanced technique has been developed that allows batteries, such as the nickel-cadmium type, to be quickly charged without risking the danger of overcharging and the consequent cell rupture. However, these techniques require the use of complicated and extensive circuitry and therefore are rather costly to produce.

SUMMARY OF THE INVENTION

In view of the foregoing factors and conditions characteristic of prior art battery chargers, it is a primary object of the present invention to provide a new and improved battery charger not subject to the disadvantages enumerated above and utilizing an economical and simple sequential switching arrangement for discharging a battery and then recharging the battery for a predetermined period of time and at a predetermined rate.

Another object of the present invention is to provide a battery charger for rapidly recharging rechargeable batteries without the hazard of overcharging.

Still another object of the present invention is to provide an economical, simple and yet effective battery charger that is suitable for rapidly recharging small capacity batteries such as may be used in toys, miniature appliances and the like.

A further object of the present invention is to provide a battery charger that will rapidly charge or recharge sealed nickel-cadmium batteries without requiring the use of sensitive voltage-sensing devices or circuitry to prevent damage due to overheating.

Accordingly, the present invention involves a battery charger, for charging rechargeable batteries, which includes a source of DC charging current and a pair of terminals across which a battery to be charged may be connected. These terminals are electrically connected to the source of DC current to allow a charging current to flow through the battery. Also included is a discharge circuit for discharging the battery at a predetermined rate wherein all batteries are first discharged and then charged by having a switching mechanism first provide a short circuit between the battery terminals and then couple the battery to the source of DC current. The switching mechanism is operated by a spring motor.

A battery charger constructed according to the present invention provides for the discharging of a battery for a predetermined period of time and at a predetermined discharge rate prior to charging the same battery for a predetermined charge period and at a predetermined charging rate. This timed sequential discharge-charge cycle charging technique prevents the possibility of overcharging an already charged battery and provides a high rate of charge for a limited period of time whereby the dangers associated with overcharging are obviated.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which like reference characters refer to like elements in the several views.

BRIEF DESCRIPTION OF THE DRAWING

FIG. 1 is an isometric diagram illustrating a possible external configuration of a battery charger, in accordance with the present invention;

FIG. 2 is a schematic diagram illustrating a fragmented cross-sectional side view of a preferred embodiment of the present invention taken along line 2—2 of FIG. 1;

FIG. 3 is a schematic diagram illustrating an exploded view of the switching mechanism employed in the preferred embodiment of the present invention;

FIG. 4 is a schematic diagram illustrating a fragmented side view of a portion of the switching mechanism employed in the preferred embodiment of the present invention;

FIGS. 5–7 are schematic diagrams, illustrating top views of the switching mechanism, employed in the preferred embodiment of the present invention and are useful in describing the operation of the present invention.

DESCRIPTION OF THE PREFERRED EMBODIMENT

Referring to FIG. 1, a battery charger, in accordance with the present invention, generally includes a housing 10 for the charging apparatus. This housing 10 may be fabricated with die-cast aluminum or with any other preferred material. An electrical cord 12 having a plug 14 protrudes from the housing 10 and serves to connect the charging apparatus to the conventional electrical socket to provide a source of AC current. Also protruding from a side portion of the housing 10 is a battery terminal 16 which may have any appropriate configuration to accommodate a battery to be charged. The top portion 17 of the housing 10 is adapted to have a knob 18 extending therethrough and a window 20, the respective functions of which will be described in detail hereinbelow.

Referring now to FIGS. 2 and 3, the charging apparatus comprises a switching mechanism 21 generally including the knob 18 which is mounted on a post 22 and a circular timing plate 24 having a concentrically oriented channel 26 extending for a substantial distance about the center of the timing plate 24. The plate 24 is equipped to have inscribed or otherwise appropriately placed, on the upper surface 27, thereof, a sequence of numbers, the purpose of which is to be later discussed in greater detail.

Also included in the switching mechanism is a circular contact plate 28 having a concentrically oriented channel 30 which extends about the center of the contact plate 28. An aperture 31 is provided at the center of the contact plate 28 to accommodate a post 32 extending from the lower surface 34 of the timing plate 24. The contact plate 28 which may be fabricated of brass, or any other appropriate electrically conductive metal, is further designed to have a contact button 38 extending from a lower surface 38 of the contact plate 28 and an electrical terminal 40 which may be formed by cutting an internal strip in the contact plate 28, which strip is deformed to provide an extending tongue.

Further included in the switching mechanism is a rectangular contact base 42 which may be formed of a suitable plastic material. This rectangular contact base 42 is adapted to have a semicircular cutout portion 44 at one end thereof and a plateaulike cam 46 mounted on the surface 48 at the other end thereof. A molded spacer 50, on the surface 48 of the base 42, serves to transfer spring force to the contact plate 28 being normally positioned in sliding frictional contact therewith. The base 42 is formed to have a centrally situated aperture 52 to accommodate the post 32 by allowing the post 32 to freely extend through the base 42. A pair of electrical contact studs 54 and 56 are mounted on and extend upwardly through the base 42. A flexible cantilever support 58 is provided along the longitudinal axis of the base 42, which cantilever support 58 is axially aligned with the spacer 50 and has a protuberance 59 extending away from the surface 48 of the base 42 for a distance substantially the same as the spacer 50. The plateaulike cam 46, on the other hand, extends above the surface 48 of the base 42 for a distance that is greater than that of the spacer 50 and the protuberance 52.

The electrical contact studs 54 and 56 respectively serve as a discharge contact and a charge contact and are adapted to be respectively connected to an electrical lead 60 which is maintained at a ground potential and an electrical lead 62 which is maintained at a charging potential.

A coil spring 64 is employed to movably bias the base 42 away from a spring motor works cover 66 by being placed between the base 42 and the works cover 66.

In the assembly of the switching mechanism 21, the post 22 of the knob 18 first extends through the channel 26 of the timing plate 24, then through the channel 30 of the contact plate 28 before being secured to a winding shaft 78 which extends upwardly through the works cover 66. The post 32 of the timing plate 24 extends through the aperture 31 of the contact plate 28 and then through the aperture 52 of the base 42 before finally extending longitudinally through the coil spring 64 and being secured to an output shaft 72 also protruding through the upper surface of the works cover 66. The contact plate 28 is mounted such that the contact button 36 is extending downwardly towards the contact base 42 which in turn is mounted such that the upper surface 48, thereof, is adjacent the contact plate 28 and the cutout portion 44 is in semisurrounding relationship with the post 22 of the knob 18.

As earlier explained, the spacer 50 serves to maintain the adjacent surfaces of the timing plate 24 and the contact plate 28 in abutting friction contact such that rotation of the timing plate 24, in a fashion to be hereinafter explained, will result in the contact plate 28 being also rotated for as long as the contact 28 is free to rotate. Whenever the contact plate 28 is not free to rotate, the adjacent surfaces of the contact plate 28 and the timing plate 24 will operate in sliding relationship with the contact plate 28 remaining still while the timing plate 24 continues to rotate through a predetermined distance. The distance through which the contact plate 28 is permitted to rotate is determined by the distance through which the contact button 36 must travel to first be in electrical contact with the contact stud 54 and then with the contact stud 56.

The flexible cantilever support 58 having the protuberance or post 59 serves to prevent the plate 28 from falling, due to the force of gravity, to contact either of the studs 54 or 56 at the end of the full cycle.

It is to be noted that the diameter of the contact plate 28 is smaller than the diameter of the timing plate 28 which is also adapted to have a downwardly extending boss 90 situated along the periphery of the lower surface 34 and aligned approximately diametrically opposite a neck portion 92 formed by respective ends of the channel 26.

Referring to FIG. 4, this boss 90 is shaped such that after a predetermined amount of clockwise rotation, indicated by the arrow 94, of the timing plate 24, the boss 90 will slideably contact the plateaulike cam 46 on the upper surface 48 of the base 42 and thereby force the base 42 away from the timing plate 24, as indicated by the arrow 96, which, as previously mentioned, is maintained in an abutting relationship with the timing plate 24 by the spacer 50. The cantilever support 58 having the protuberance 59 assures that all electrical contact between the studs 54 and 56 and the contact plate 28 is broken at the end of a full cycle. The distance through which the base 42 is moved downwardly, or away from the plate 24 and 28, must be sufficient to break the physical contact between the contact button 36 and the contact stud 56. This distance of movement may be appropriately set by taking into consideration the respective combined lengths of the contact button 36 and the contact stud 56 and of the boss 90 and the plateaulike cam 46.

Referring once again to FIGS. 2 and 3, the battery charger is mechanically driven by a spring-motor works 68 which includes a coiled-leaf spring 70 that is appropriately wound about the output shaft 72 and has one end fastened to the works cover 66. The spring 70 is wound by rotation of the output shaft 72 in one predetermined direction through the circular gear 74 which is mounted on the output shaft 72 and which contacts a pinion 76 which itself is mounted on the winding shaft 78 to which the post 22 of the knob 18 is secured. Winding of the knob 18 in a clockwise direction, as indicated by the arrow 80, for example, causes the output shaft to rotate in a counterclockwise direction and as such results in the spring 70 being wound.

A conventional speed control arrangement is employed to control the speed at which the spring may be unwound and thereby control the rotational speed of the output shaft. This speed control arrangement may include, for example, a governor escapement 82 which is mechanically coupled to the output shaft 72 by a gear train including a star gear 84, an idler gear 86, a wobble gear 87 and a windup gear 88 which is mounted on the winding shaft 78. The purpose of this gear train is to maintain a higher-than-normal gear ratio for the slow rotation of the output shaft 72 in order to allow rapid escapement action and to provide radial wobble gear engagement.

As earlier explained, the contact studs 54 and 56 are respectively coupled to the electrical leads 60 and 62. As illustrated by FIG. 5, the electrical leads 60 and 62 are connected to a full-wave rectifier circuit including a transformer having a primary coil 102 and a secondary coil 104. The primary coil 102 is intended to be connected to a source of AC current by a conventional electrical cord 12. The respective ends of the secondary coil 104 are connected through a pair of diodes to the contact stud 56 by the lead 62. The lead 60 is connected to a center top of the secondary coil 104 for the purpose of maintaining the contact stud 54 at a ground or reference potential. The electrical lead also serves as one connection to the battery terminal or plug 16. The other necessary connection to the battery terminal 16 is provided by a lead 106 which is coupled to the electrical terminal 40 formed by the deformed strip on the contact plate 28.

It is thus clear that when the button 36 is in contact with the contact stud 54, a battery operatively coupled to the battery terminal 16 will be discharged due to the respective terminals of the battery being shorted through the contact plate 28. However, when the button 36 is in contact with the contact stud 56, charging current is allowed to flow through a battery coupled to the terminal 16 by way of the path provided by the lead 62, the contact plate 28 and the lead 106. It is to be noted that when the button 36 is in physical contact with neither the stud 54 nor stud 56, a battery coupled to the terminal 16 will be neither discharged nor charged.

Operationally, the knob 18 is wound in a clockwise fashion, as indicated by the arrow 80 in FIG. 3, to cause the timing plate 24 to be rotated counterclockwise due to the transfer of motion performed by the pinion 76 and the circular gear 74. The timing plate 24 is allowed to rotate until the end 98 of the channel 26 abuts the post 22 as shown in FIG. 5. Accordingly, the contact plate 28 is also rotated in a counterclockwise direction thereby bringing the button 36 into sliding physical contact with the contact stud 54. The end of the aperture 30, by striking the post 22, will stop the movement of the contact plate 28 thereby causing the contact plate 28 and the timing plate 24 to be in sliding relationship as the timing plate 24 continues to be rotated. Additionally, physical contact between the button 36 and the contact stud 54 serves to discharge a battery coupled to the terminal 16, as earlier explained. It is to be noted that the button 36 is maintained in physical contact with the stud 54 as the button 36 slides across the stud 54.

The spring 70 being wound, causes the timing plate 24 and the contact plate 28 to be rotated clockwise, as indicated by the arrow 108, thereby bringing the button 36 into physical contact with the contact stud 56 to initiate charging of a battery coupled to the terminal 16 by reason of the charging current being allowed to flow through the battery as earlier explained and as shown by FIG. 6. It is to be noted that the contact plate 24 again assumes a sliding relationship with the timing plate 28 when movement of the plate 28 is stopped by the other end of the aperture 30 striking the post 22. The button 36 is thus maintained in contact with the contact stud 56.

As illustrated by FIG. 7, the timing plate 28 is allowed to rotate in a clockwise direction until the end 100 of the channel 26 comes into abutting relationship with the post 22. At this point, the boss 90 will have come into sliding contact with the plateaulike cam 46 so as to force the base 42 downward, as indicated by the arrow 98, and thereby break the physical contact between the button 36 and the contact stud 56. The charging of a battery coupled to the terminal 16 will thus have been terminated.

It is understood that the sequence of numerals placed on the surface 27 of the timing plate 24 may be suitably arranged in any convenient manner. In the embodiment illustrated by the figures of the accompanying drawings, the numerals are arranged to be seen through the window 20 in the top portion 17 of the housing 10 wherein the lowest numeral is seen when the spring mechanism is in a wound position with the end 98 of the channel 26 abutting the post 22. The highest numeral is seen through the window 20 when the spring mechanism is unwound with the end 100 of the channel 26 abutting the post 22. The numerals may refer to minutes, for example, so as to give a user of the present invention an indication of the progress of the charging of a battery.

From the foregoing description, it is evident that use of the present invention will not cause overcharging and consequent damage to a battery, in that all batteries will be charged at a predetermined safe rate starting from approximately the same condition of discharge regardless of whether the battery is fully charged or fully discharged.

It is to be noted that where nickel-cadium cells just taken out of storage are to be charged, it has been found that the nickel-cadium cells should not be immediately charged but should first be fully discharged in order to down any oxide that may have formed on the cadmium electrode electrode such that oxygen will be allowed to react with the metallic cadmium and thereby provide proper operation of the cells.

Although the invention has been specifically described in connection with nickel-cadmium batteries, other types of batteries, such as the lead-acid and silver-cadmium types, may also be charged by battery chargers constructed according to this invention.

While a preferred embodiment of the invention has been described, it is clear that numerous modifications and other embodiments may be made within the skill of the ordinary engineer and with the exercise of inventive faculties. For example, the invention may also be practiced by utilizing well-known "clamp" circuits, as well as conventional full-wave rectifier circuits, as a means of providing the desired DC charging current. Accordingly, the scope of this invention is defined by the scope of the following claims.

What is claimed is:

1. A battery charger having a discharge-charge cycle for charging rechargeable batteries, said battery charger comprising:
   a switching mechanism for sequentially discharging and then charging a battery, said switching mechanism including a discharge contact stud, a charge contact stud, a plateau cam, a contact plate having a contact button, and a timing plate having a circuit breaking boss; and
   a motor operatively coupled to said timing plate and said contact plate wherein said contact plate is rotated to have said contact button first in physical contact with said discharge contact stud and then in physical contact with said charge contact stud and said timing plate is simultaneously rotated to have said circuit-breaking boss come into slideable abutting relationship with said plateau cam.

2. The apparatus defined by claim 1 wherein said contact plate is electrically conductive.

3. The apparatus defined by claim 2 further including a first-battery terminal lead coupled to said contact plate; and a second-battery terminal lead coupled to said discharge contact stud whereby the terminals of a battery, when coupled to said first- and second-battery terminal leads, are short-circuited through said contact plate when said contact button is in physical contact with said discharge contact stud.

4. The apparatus defined by claim 3 further including a source of DC charging current operatively coupled to said charge contact stud and said second-battery terminal lead whereby charging current is permitted to flow through a battery coupled to said first- and second-battery terminal leads whenever said contact button is in physical contact with said charge-contact stud.

5. The apparatus defined by claim 1 wherein said motor includes a coiled-leaf spring and a speed-control mechanism for controlling the rate at which said coiled-leaf spring is permitted to be uncoiled.

6. The apparatus defined by claim 5 further including a knob, operatively coupled to said coiled-spring, for coiling said spring when in an uncoiled condition.

7. The apparatus defined by claim 6 wherein said timing plate further includes a semicircular channel that is concentrically oriented about the center of said timing plate, and said knob is operatively coupled to said coiled-leaf spring by a post that extends through said semicircular channel, wherein the length of said channel determines the time duration of said discharge-charge cycle.

8. The apparatus defined by claim 1 wherein said timing plate and said contact plate are maintained in slidable friction contact.

9. The apparatus defined by claim 1 further including a moveable base on which said plateau cam, said discharge-contact stud and said charge-contact stud are mounted whereby whenever said circuit-breaking boss and said plateau cam are in slideable-abutting relationship, said moveable base is moved away from said contact plate thereby breaking any physical contact between said contact button and said charge-contact stud.

10. The apparatus defined by claim 9 further including a motor cover for partially enclosing said motor and a coil spring situated between said base and said motor cover for supporting said moveable base.